UNITED STATES PATENT OFFICE.

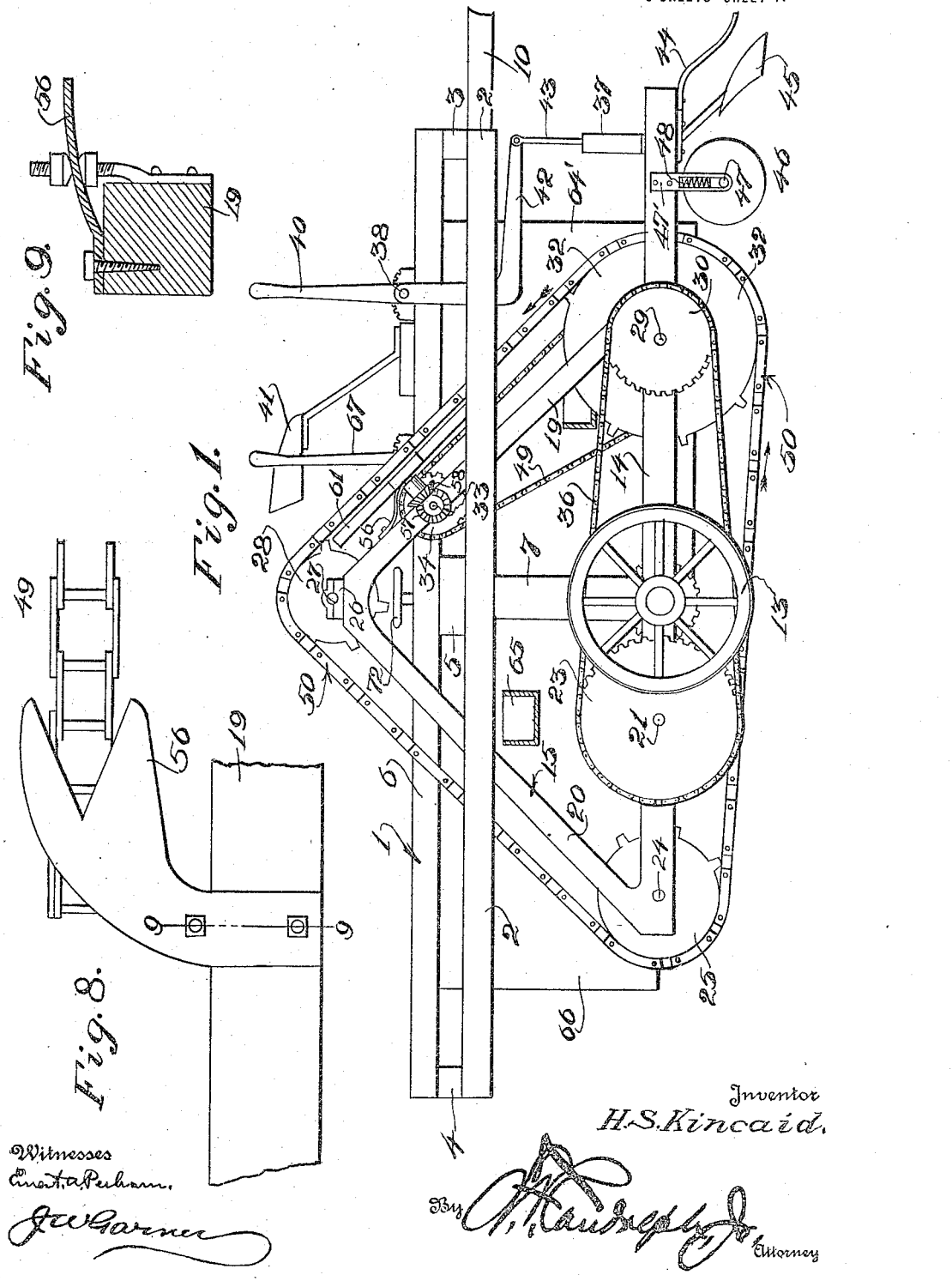

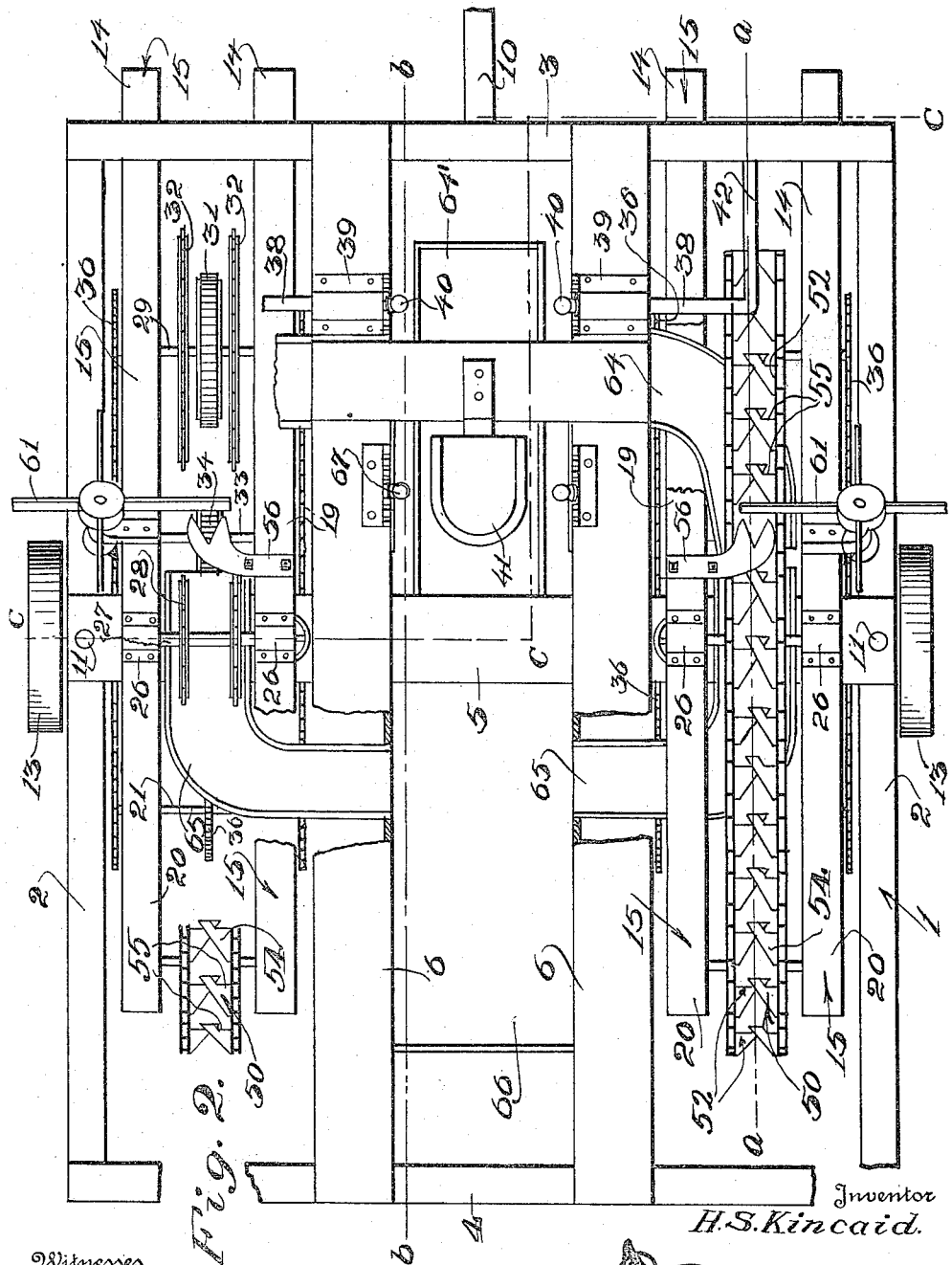

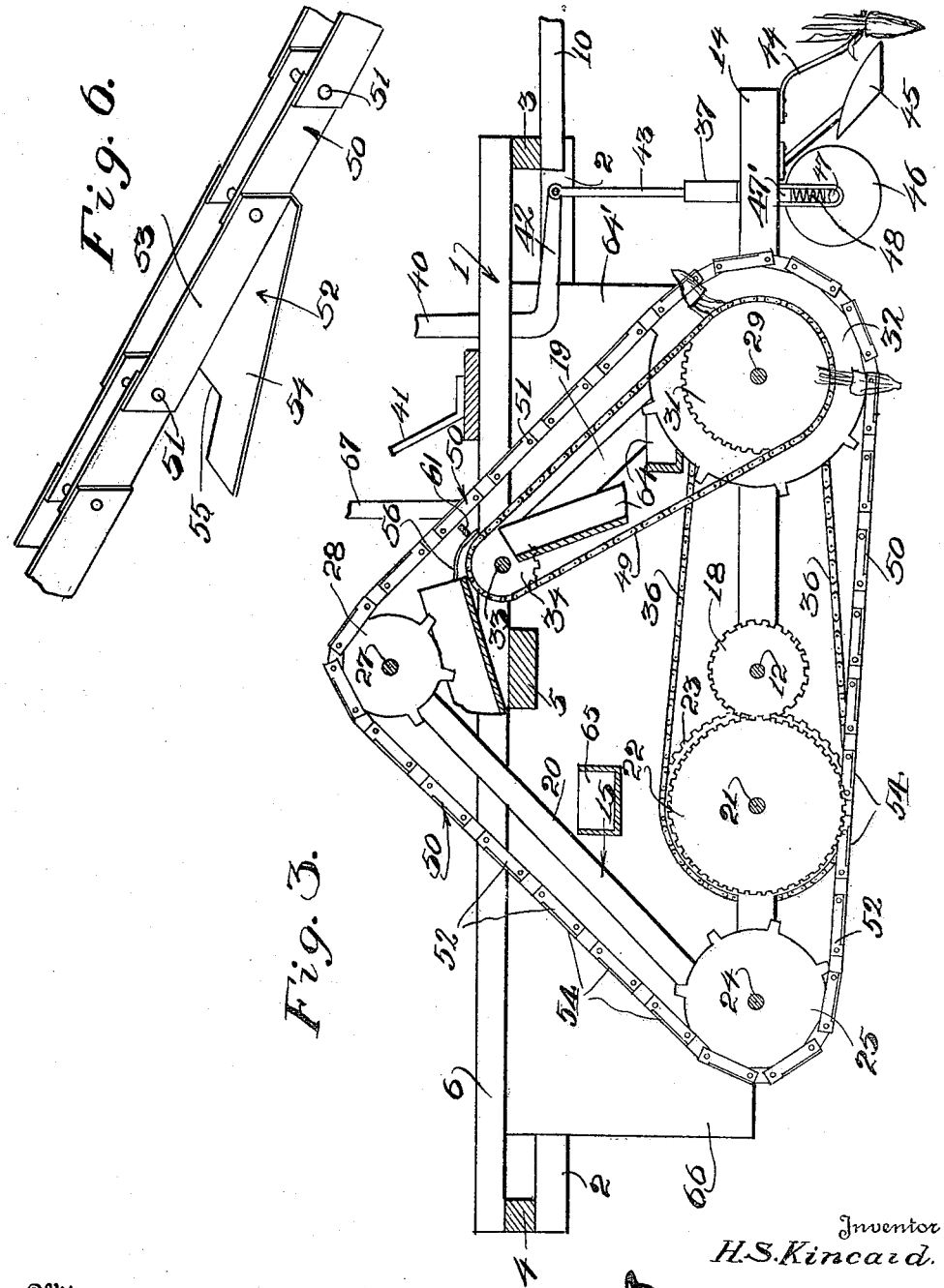

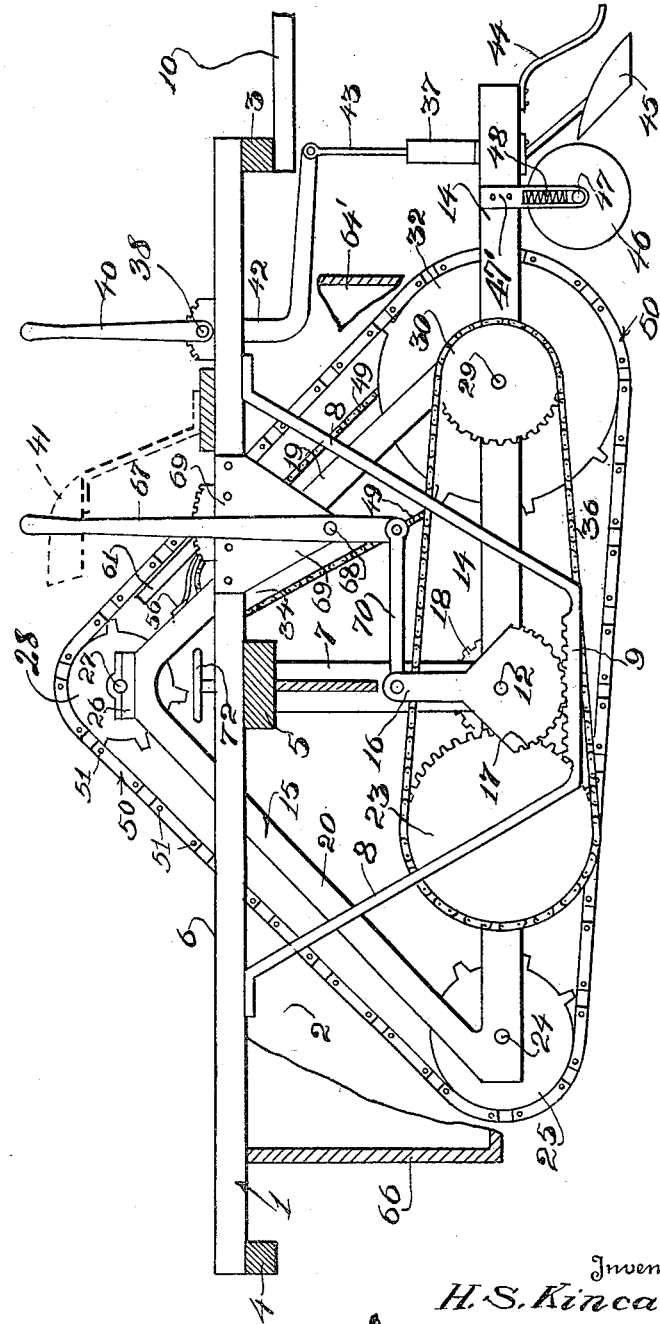

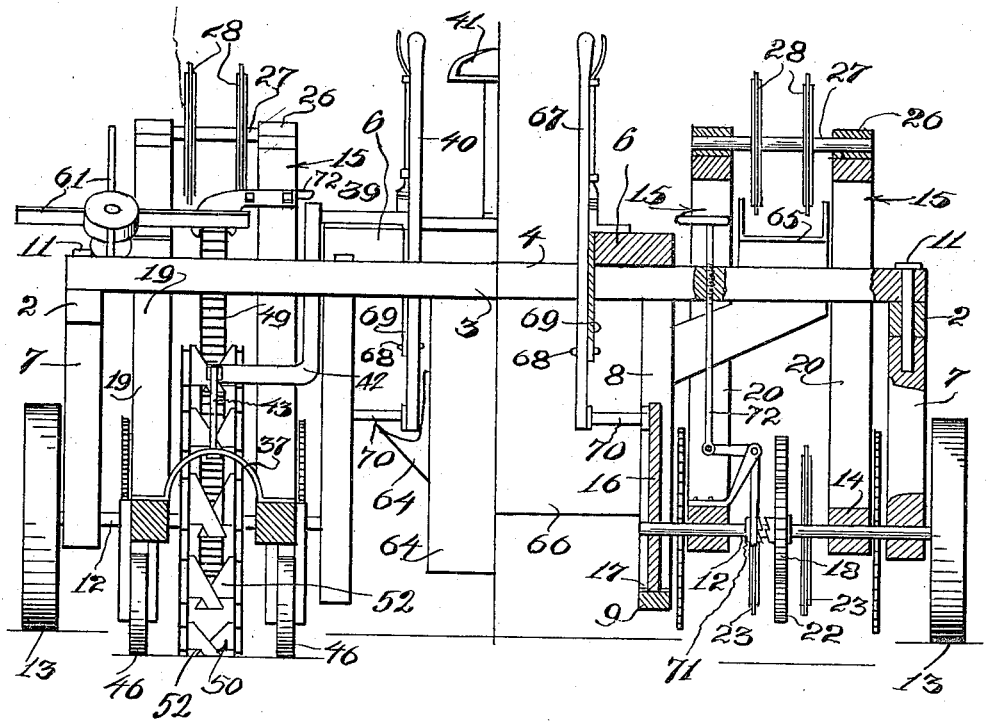

HENRY S. KINCAID, OF BELLEVUE, MICHIGAN.

BEET-HARVESTING MACHINE.

1,194,189.     Specification of Letters Patent.     Patented Aug. 8, 1916.

Application filed July 7, 1915. Serial No. 38,441.

*To all whom it may concern:*

Be it known that I, HENRY S. KINCAID, a citizen of the United States, residing at Bellevue, in the county of Eaton and State of Michigan, have invented certain new and useful Improvements in Beet-Harvesting Machines; and I do hereby declare the following to be a full, clear, and exact description of the invention, such as will enable others skilled in the art to which it appertains to make and use the same.

This invention is an improved beet harvesting machine especially adapted for plowing out and pulling up sugar beets from the rows and for cutting off the beet tops, the object of the invention being to provide an improved machine of this class which is automatic in operation, may be readily controlled and which may be constructed for digging two or more rows of beets simultaneously.

One specific object of the invention is to effect improvements in the construction of the beet digging and beet pulling mechanism.

Another object is to provide improved means for putting the machine in and out of gear.

Another object is to effect improvements in the construction of the means for cutting off the beet tops.

The invention consists in the construction, combination and arrangement of devices hereinafter described and claimed.

In the accompanying drawings:—Figure 1 is a side elevation of a beet harvesting machine constructed in accordance with my invention. Fig. 2 is a plan of the same. Fig. 3 is a vertical longitudinal sectional view of the same on the plane indicated by the line $a$—$a$ of Fig. 2. Fig. 4 is a similar view on the plane indicated by the line $b$—$b$ of Fig. 2. Fig. 5 is a transverse sectional view on the plane indicated by the line $c$—$c$ of Fig. 2. Fig. 6 is a detail perspective view of one of the beet digger or puller chains. Figs. 7—8—9 are detail views.

The main frame 1 is here shown as comprising side bars 2, a front cross bar 3, a rear cross bar 4, an intermediate cross bar 5 and a pair of spaced longitudinal bars 6 which are arranged a suitable distance from the opposite sides of the vertical longitudinal center of the frame. Standards 7 depend from the centers of the bars 2 and the bars 6 are provided with hanger brackets 8, horizontally and longitudinally arranged rack bars 9 being secured to and connecting the lower ends of the hanger brackets. A draft pole or tongue 10 is attached to the front of the frame 1 and provided with the usual whiffle-tree, swingle-trees and neck yoke for the attachment of a team.

The standards 7 are pivotally mounted as at 11 for angular movement in a horizontal plane and each standard is provided at its lower end with a bearing for a driving shaft 12. Each driving shaft has a traction wheel 13 at its outer end and is also mounted in bearings in the side beams 14 of a digger frame 15. As here shown two of the digger frames are provided and said digger frames are arranged near opposite sides of the frame 1 and are suitably spaced apart so that the distance from center to center of said frames 15 corresponds with the width of the space between two contiguous rows of beets. Each driving shaft has a lever 16 pivotally mounted at its inner end, each of said levers having a segment gear 17 at its lower end which engages one of the rack bars 9. Each shaft 12 also has a spur gear 18 fixed thereto for rotation therewith and arranged midway between the side beams 14 of the frame 15. Each frame 15 also comprises upwardly converging bars 19—20 which have their lower ends secured to the beams 14 and their upper ends secured together. The cross bar 5 of the main frame passes between the bars 19—20 of the digger frames. Each digger frame is provided, at a point a suitable distance in rear of the driving shaft 12 with a counter-shaft 21 which has a gear 22 at its center, engaged by the gear 18 and also has sprocket wheels 23 at its ends. Near the rear end of each digger frame is a shaft 24 on which a pair of spaced direction sprocket wheels 25 are mounted. Bearings 26 are at the upper ends of the upwardly extending inclined bars 19—20 and a shaft 27 is mounted in said bearings and provided with a pair of spaced direction sprocket wheels 28. A shaft 29 is mounted in bearings in the beams 14 at a suitable distance from the front end of each digger frame 15 and said shaft is provided at its ends with sprocket wheels 30, has a sprocket wheel 31 at its center and is also provided with a pair of spaced sprocket wheels 32. A shaft 33 is mounted in bearings a suitable distance from the upper ends of the bars 19 and is provided with a centrally arranged sprocket wheel 34.

Sprocket wheels 30 are secured to the ends of the shaft 29 and are connected by endless sprocket chains 36 to the sprocket wheels 23 of the counter-shaft 21.

The front ends of the beams 14 of each digger frame are connected together by a yoke 37. Rock shafts 38 are mounted in bearings 39 near the front ends of the bars 5, each rock shaft having a lever 40 at its inner end within convenient reach of the operator on the seat 41 and being provided at its outer end with a crank arm 42. Rods 43 connect said crank arms with the yokes 37 and hence the front ends of the digger frames may be raised or lowered as required by operating the levers 40, as will be understood, the digger frames pivoting on their driving shafts 12 and being angularly movable in vertical planes.

At the front end of each beam 14 of each digger frame 15 is a lifting arm 44. Said lifting arms are suitably spaced apart, run on opposite sides of the rows and serve to lift the leaves of the beet up from the ground. Plows 45 are arranged slightly to the rear of the lifting arms 44 and serve to turn out light furrows from opposite sides of the beet rows and in rear of the plows are front colters or gage wheels 46 the shafts 47 of which are mounted in bearings which travel in vertical slots in standard forks 47′, coiled springs 48 bearing downwardly on said bearings. These gage wheels support the front ends of the digger frames and hence relieve the team of down draft.

An endless traveling carrier chain 49 is provided for each digger frame and is arranged to connect the sprocket wheels 31—34 and hence the front leads of said carrier chains are inclined upwardly and rearwardly. Each digger frame is also provided with a pair of endless puller chains 50, said chains connecting the sprocket wheels 25—28—32. Owing to the gears 18—22 which connect the driving shafts 12 with the counter shaft 21, the puller chains and the carrier chains are caused to operate in the same direction, the lower leads of the puller chains moving forwardly as indicated by the arrow in Fig. 1 and the front leads of the puller chains and carrier chains moving upwardly and rearwardly as indicated by the arrows in said figure. The links of the carrier chains and puller chains are of suitable length. The links of the puller chains are pivotally connected together as at 51 and each link of each puller chain is provided on its inner side with a puller plate or hoe 52 made of angle iron, having a vertical web 53 secured to one side of the chain link and having a triangular blade 54 which widens rearwardly and is provided in its rear end with a notch 55.

In practice the puller chains will have links of such length and the puller plates or hoes will be so proportioned and secured to said links that the hoes or puller plates of each puller chain will be arranged about six inches apart.

It will be observed that the puller chains are arranged to operate on opposite sides of the beet rows in the furrows turned by the plows and that the puller plates or hoes, owing to the forward movement of the lower leads of the puller chains and the upward and rearward movement of the front leads of said chains will be caused to move under and grab the beets, and pull the beets upwardly as said chains pass around the wheels 32 and that the beets as they are pulled up by the puller chains and their plates or hoes will drop on the front leads of the carrier chains and hence the beets, top lowermost, will be carried upon the front leads of the carrier chains and between them and the front leads of the puller chains which are spaced therefrom.

As the beets reach the upper sides of the sprocket wheels 34 on which the upper portions of the carrier chains turn the tops of the beets will pass into the crotches of forked knives 56. Each shaft 33 has a beveled pinion 57 at its outer end which is engaged by a similar pinion 58 at the lower end of a vertical shaft 59. Said shafts are mounted in suitable bearings in supporting frames 60 and are revolved by the gears 57—58 as will be understood, and are provided with radially arranged arms 61 which sweep rearwardly over the knives and hence cause the beet tops to be cut by the knives and also serve to throw the beet tops into inclined troughs 64 which deliver the beet tops, by gravity, to bins 64′, the beets after being thus topped dropping into inclined troughs 65 which by gravity discharge the beets into suitable bins 66.

Levers 67 are fulcrumed as at 68 to hanger brackets 69 which depend from the bars 6, the said levers being arranged within convenient reach of the seat. Rods 70 connect said levers with the segment levers 16. It being noted that the digger frames are pivotally mounted below the frame for horizontal angular movement, as hereinbefore stated, it will be understood that by operating the hand levers the levers 16 may be turned to cause the segments 17 by coaction with the rack bars 9 to turn or move the front ends of the digger frames laterally, either toward or from each other and either separately or simultaneously, thus enabling the driver to keep the digger frames always in line with and over the beet rows.

To put the machine in or out of gear I provide suitable clutches 71 for the gears 18 and levers 72 to operate said clutches.

While I have herein shown and described a preferred form of my invention I would have it understood that changes may be made in the form, proportion and construction of the several parts without departing from the spirit of the invention and within the scope of the appended claims.

Having thus described my invention, I claim:—

1. In a beet harvesting machine a frame, supports, including a traction wheel, for said frame, a shaft turned by the traction wheel, a counter shaft geared to the shaft of the traction wheel and turned reversely thereby, an endless traveling carrier, endless traveling puller chains arranged on opposite sides of the vertical plane of the carrier and provided with beet puller plates, direction elements for the endless carrier, direction elements for the puller chains, and power connections between the endless carrier, endless puller chains, and the countershaft so that said carrier and endless puller chains are driven from the countershaft.

2. In a beet harvesting machine a frame, a driving shaft mounted in bearings in the frame and provided with a traction wheel, a countershaft geared to the driving shaft and turned reversely thereby, said counter shaft having sprocket wheels, endless puller chains arranged in spaced relation and in vertical planes and provided on their opposing sides with beet puller plates, shafts mounted in the frame and having sprocket wheels engaged by said puller chains, one of said shafts also having sprocket wheels, chains connecting said sprocket wheels with those of the counter shaft, a sprocket wheel on said counter shaft, and arranged midway between the puller chains, a direction sprocket wheel also mounted for rotation on said frame and arranged between the puller chains and an endless traveling carrier connecting the last-named sprocket wheels and arranged between the puller chains, one lead of said endless carrier being arranged in spaced relation to and between leads of said puller chains.

3. In a beet harvesting machine a frame, a driving shaft mounted in bearings in the frame and provided with a traction wheel, a countershaft geared to the driving shaft and turned reversely thereby, said counter shaft having sprocket wheels, endless puller chains arranged in spaced relation and in vertical planes and provided on their opposing sides with beet puller plates, shafts mounted in the frame and having sprocket wheels engaged by said puller chains, one of said shafts also having sprocket wheels, chains connecting said sprocket wheels with those of the counter shaft, a sprocket wheel on said counter shaft, and arranged midway between the puller chains, a direction sprocket wheel also mounted for rotation on said frame and arranged between the puller chains and an endless traveling carrier between the last named sprocket wheels and arranged between the puller chains, one lead of said endless carrier being arranged in spaced relation to and between leads of said puller chains, the said frame being also provided at its front end with plows to operate on opposite sides of the beet row.

4. In a beet harvesting machine a frame, a driving shaft mounted in bearings in the frame and provided with a traction wheel, a countershaft geared to the driving shaft and turned reversely thereby, said counter shaft having sprocket wheels, endless puller chains arranged in spaced relation and in vertical planes and provided on their opposing sides with beet puller plates, shafts mounted in the frame and having sprocket wheels engaged by said puller chains, one of said shafts also having sprocket wheels, chains connecting said sprocket wheels with those of the counter shaft, a sprocket wheel on said counter shaft, and arranged midway between the puller chains, a direction sprocket wheel also mounted for rotation on said frame and arranged between the puller chains and an endless traveling carrier between the last named sprocket wheels and arranged between the puller chains, and leads of said endless carrier being arranged in spaced relation to and between leads of said puller chains, the said frame being also provided at its front end with plows to operate on opposite sides of the beet row, and being further provided with lifting arms arranged in front of said plows.

5. In a beet harvesting machine a frame, endless puller chains arranged in spaced relation and in vertical planes and having upwardly and rearwardly inclined front leads, supporting devices for said puller chains, beet digging devices carried and operated by said puller chains, an endless carrier arranged in spaced relation to, between, and in rear of the front leads of the puller chains, supporting devices for said endless carrier, means to operate said puller chains and endless carrier and cause their front leads to move upwardly, a cutter arranged above the endless carrier and to which beet tops are presented between the carrier and the puller chains and a revoluble element having arms to move across the cutter and coact therewith to cause the cutter to cut off the beet tops.

In testimony whereof I affix my signature in presence of two witnesses.

HENRY S. KINCAID.

Witnesses:
A. L. ACKLEY,
ALFRED SCHULER.

Copies of this patent may be obtained for five cents each, by addressing the "Commissioner of Patents, Washington, D. C."